United States Patent
Simpkins et al.

(10) Patent No.: US 8,048,587 B2
(45) Date of Patent: Nov. 1, 2011

(54) COMPLIANT CURRENT COLLECTOR FOR FUEL CELL ANODE AND CATHODE

(75) Inventors: Haskell Simpkins, Cincinnati, OH (US); Karl J. Haltiner, Jr., Fairport, NY (US); Subhasish Mukerjee, Rochester, NY (US); Kenneth Scott Weil, Richland, WA (US); Dean Paxton, Kennewick, WA (US)

(73) Assignees: Delphi Technologies, Inc., Troy, MI (US); Batelle Memorial Institute, Troy, MI (US)

( * ) Notice: Subject to any disclaimer, the term of this patent is extended or adjusted under 35 U.S.C. 154(b) by 1389 days.

(21) Appl. No.: 10/305,881

(22) Filed: Nov. 27, 2002

(65) Prior Publication Data
US 2004/0101742 A1 May 27, 2004

(51) Int. Cl.
*H01M 4/86* (2006.01)
*H01M 8/02* (2006.01)

(52) U.S. Cl. .................. 429/514; 429/468; 429/522

(58) Field of Classification Search ............ 429/27, 429/30, 34, 41, 42, 191, 210, 33, 38, 39, 429/44; 502/326; D5/54; 55/332, 525; 140/3, 140/7
See application file for complete search history.

(56) References Cited

U.S. PATENT DOCUMENTS

| 399,616 | A | * | 3/1889 | Hurford | 209/401 |
| 1,078,380 | A | * | 11/1913 | Reynolds | 140/7 |
| 1,139,469 | A | * | 5/1915 | Potter | 209/401 |
| 1,147,279 | A | * | 7/1915 | Sweetland | 139/425 R |
| 1,525,532 | A | * | 2/1925 | Black | 139/425 A |
| 1,829,498 | A | * | 10/1931 | Boehm | 245/8 |
| 1,907,056 | A | * | 5/1933 | Galloway | 245/8 |
| 2,160,715 | A | * | 5/1939 | Blaisdell et al. | 140/7 |
| 2,257,993 | A | * | 10/1941 | Young | 140/7 |
| 2,271,662 | A | * | 2/1942 | Rubissow | 140/7 |
| D177,149 | S | * | 3/1956 | Prince | D26/121 |

(Continued)

FOREIGN PATENT DOCUMENTS
DE 19517443 A1 * 11/1996
(Continued)

OTHER PUBLICATIONS

Tortora, Phyllis, "Understanding Textiles", 1978, Prentice Hall, 5th Edition, pp. 272-277.*

(Continued)

*Primary Examiner* — R Hodge
(74) *Attorney, Agent, or Firm* — Thomas N. Twomey

(57) ABSTRACT

An electrically-conductive mesh spacer incorporated into the hydrogen and air gas flow spaces between each anode and cathode and its adjacent interconnect in a fuel cell stack. The mesh is formed of metal strands and is formed into a predetermined three-dimensional pattern to make contact at a plurality of points on the surfaces of the electrode and the interconnect element. The formed mesh spacer is secured as by brazing to the interconnect element at a plurality of locations to form an interconnect, which preserves the pattern during assembly of a fuel cell stack. The height of the formed pattern is greater than the height of a gas flow space after fuel cell assembly, such that the mesh spacer is slightly compressed during assembly of a fuel cell stack. Because the metal mesh is both compliant and resilient, the compressed spacer is continuously urged into mechanical and electrical contact with its electrode over all temperatures and pressures to which the fuel cell assembly may be subjected during use.

12 Claims, 4 Drawing Sheets

U.S. PATENT DOCUMENTS

| | | | |
|---|---|---|---|
| D180,884 S * | 8/1957 | Pomeroy | D5/54 |
| 2,874,730 A * | 2/1959 | Pomeroy | 139/425 R |
| 3,343,990 A * | 9/1967 | Giddy | 429/42 |
| 3,394,032 A * | 7/1968 | Danner | 429/26 |
| 3,407,572 A * | 10/1968 | Tolley | 55/283 |
| 3,432,363 A * | 3/1969 | Gillis | 429/12 |
| 3,659,402 A * | 5/1972 | Alliger | 96/297 |
| 3,673,058 A * | 6/1972 | Jackson et al. | 428/118 |
| 4,342,792 A * | 8/1982 | Brown et al. | 427/453 |
| 4,436,592 A * | 3/1984 | Norris et al. | 205/50 |
| 5,029,779 A * | 7/1991 | Bruggeman | 245/4 |
| 5,064,734 A * | 11/1991 | Nazmy | 429/33 |
| 5,114,812 A * | 5/1992 | Disselbeck et al. | 429/234 |
| 5,266,279 A * | 11/1993 | Haerle | 422/177 |
| 5,527,590 A * | 6/1996 | Priluck | 428/198 |
| 5,607,743 A * | 3/1997 | Disselbeck | 428/131 |
| 5,798,187 A * | 8/1998 | Wilson et al. | 429/26 |
| 6,022,634 A * | 2/2000 | Ramunni et al. | 429/34 |
| 6,096,450 A * | 8/2000 | Walsh | 429/34 |
| D449,741 S | 10/2001 | Henderson et al. | D5/47 |
| 6,379,831 B1 * | 4/2002 | Draper et al. | 429/31 |
| 6,387,140 B1 * | 5/2002 | Choi | 55/323 |
| 6,406,523 B1 * | 6/2002 | Connor et al. | 96/125 |
| 6,444,340 B1 * | 9/2002 | Jaffrey | 429/30 |
| 6,559,094 B1 * | 5/2003 | Korotkikh et al. | 502/326 |
| 7,157,172 B2 * | 1/2007 | Draper et al. | 429/31 |
| 2002/0048700 A1 * | 4/2002 | Virkar et al. | 429/34 |
| 2003/0049513 A1 * | 3/2003 | Ito et al. | 429/34 |
| 2003/0214083 A1 * | 11/2003 | Kelly et al. | 264/571 |
| 2006/0141212 A1 * | 6/2006 | Smith et al. | 428/141 |

FOREIGN PATENT DOCUMENTS

| | | |
|---|---|---|
| EP | 0424732 A | 5/1991 |
| EP | 0817297 A | 1/1998 |
| WO | 9913522 A | 3/1999 |
| WO | 0076015 A | 12/2000 |

OTHER PUBLICATIONS

Newark Wire Cloth Company, 1998—archived by http://web.archive.org.*
Machine Translation of DE 195 17 443 A1 published Nov. 14, 1996.*
Definition of Isosceles Triangle retrieved from http://mathworld.wolfram.com/ on May 25, 2010.*
Translation of the word "verwoben" retrieved from http://dict.leo.org on May 25, 2010.*

* cited by examiner

COMPLIANT CURRENT COLLECTOR FOR FUEL CELL ANODE AND CATHODE

TECHNICAL FIELD

The present invention relates to fuel cells; more particularly, to fuel cell components for mechanically and electrically connecting anodes and cathodes to interconnect elements; and most particularly, to a three-dimensional metal mesh structure which is both compliant and resilient for providing such connection and also for forming a gas flow space adjacent the anode and cathode of a fuel cell.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions catalytically by the cathode. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells. Because each anode and cathode must have a free space for passage of gas over its surface, the cells are separated by perimeter spacers which are selectively vented to permit flow of gas to the anodes and cathodes as desired but which form seals on their axial surfaces to prevent gas leakage from the sides of the stack. The perimeter spacers may include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space. In the prior art, such electrical contacts are formed typically by a metallic foam which is readily gas-permeable or by conductive filaments. The outermost, or end, interconnects of the stack define electric terminals, or "current collectors," which may be connected across a load.

It can be difficult in using metallic foam or conductive filaments to control the axial loading between adjacent fuel cell modules. The gas flow spaces may be easily deformed during assembly of a stack, through deformation of anodes, cathodes, and or interconnects. Any such deformation affects the flow path of hydrogen and air and therefore the electrical performance of cells and the overall stack.

What is needed is an improved mechanical means for defining and maintaining the size and shape of the gas flow spaces in a fuel cell stack while also providing electrical contact between the surfaces of the electrodes and their respective interconnect elements.

It is a principal object of the present invention to provide reliable and durable electrical contact between the surfaces of the electrodes and their respective interconnect elements in a fuel cell stack.

It is a further object of the invention to provide such electrical contact while maintaining the size and shape of the gas flow spaces in a fuel cell stack.

It is a still further object of the invention to provide means for mechanical support of the fuel cell when it is subjected to thermally induced stress and vehicle vibration.

It is a still further object of the invention to provide means for influencing the flow of gases through the gas flow spaces to more evenly distribute gases over the surfaces of the electrodes and thereby improve the electric output and fuel efficiency of a fuel cell assembly.

SUMMARY OF THE INVENTION

Briefly described, in a fuel cell assembly comprising a plurality of fuel cell modules, an electrically-conductive mesh spacer is incorporated in the hydrogen and air gas flow spaces between each anode or cathode and its adjacent interconnect plate. The mesh is formed of strands of one or more metals and preferably is woven rather than felted and is formed into a predetermined three-dimensional pattern to make contact at a plurality of points on the surface of the electrode and the interconnect plate. The formed mesh spacer is secured as by brazing or welding to the interconnect plate at a plurality of locations to form an interconnect assembly, which preserves the pattern during assembly. Preferably, the axial dimension of the pattern (generally transverse of the weave direction of the mesh blank before patterning) is greater than the axial height of a gas flow space after assembly, such that the mesh spacer is slightly compressed axially during assembly. Because the metal mesh is both compliant and resilient, the compressed spacer continuously urges itself into mechanical and electrical contact with its electrode and interconnect plate over all temperatures and pressures to which the fuel cell assembly may be subjected during use. The mesh compliance also absorbs variation of gas flow space due to part tolerances.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
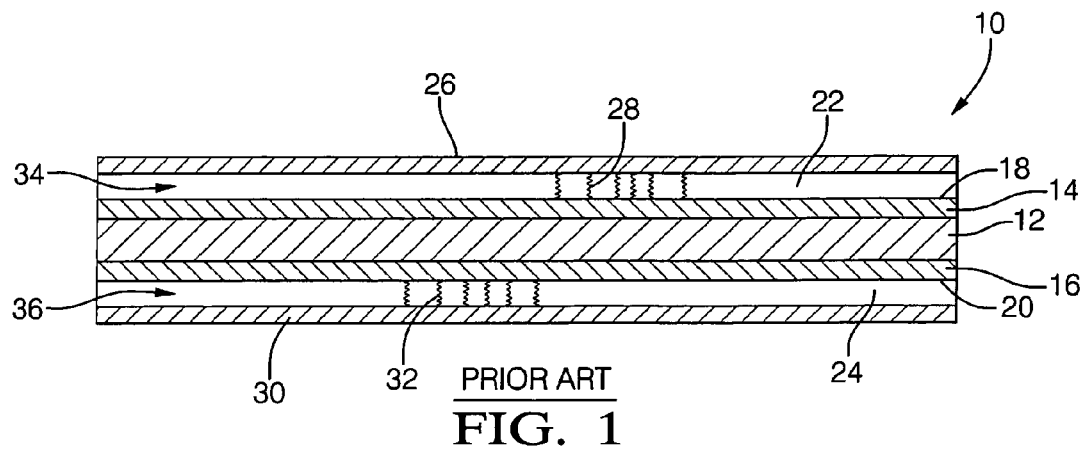
FIG. 1 is a schematic elevational cross-sectional view of a prior art solid oxide fuel cell assembly.

Referring to FIG. 1, a prior art fuel cell 10 includes elements known in the art of solid-oxide fuel cells. The example shown is of a class of such fuel cells said to be "anode-supported" in that the anode is a structural element having the electrolyte and cathode deposited upon it. Element thicknesses as shown are not to scale.

Each fuel cell 10 includes an electrolyte element 12 separating an anodic element 14 and a cathodic element 16. Each anode and cathode is in direct chemical contact with its respective surface of the electrolyte, and each anode and cathode has a respective free surface 18,20 forming one wall of a respective passageway 22,24 for flow of gas across the surface. Anode 14 faces and is electrically connected to an interconnect 26 by filaments 28 extending across but not blocking passageway 22. Similarly, cathode 16 faces and is electrically connected to interconnect 30 by filaments 32 extending across but not blocking passageway 24.

Preferably, interconnects 26,30 are formed of an alloy, typically a "superalloy," which is chemically and dimensionally stable at the elevated temperatures necessary for fuel cell operation, generally about 750° C. or higher, for example, HASTELLOY, HAYNES 230, a stainless steel, or other materials as described below. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation, reformate gas 34 is provided to passageway 22 and flows parallel to the surface of the anode across the anode in a first direction. Hydrogen and CO in the reformate gas diffuse into the anode to the interface with the electrolyte. Oxygen 36, typically in air, is provided to passageway 24 and flows parallel to the surface of the cathode in a second direction which can be orthogonal to the first direction of the reformate (second direction shown in the same direction as the first for simplicity in FIG. 1). Molecular oxygen gas ($O_2$) diffuses into the cathode and is catalytically reduced to two $O^{-2}$ anions by accepting four electrons from the cathode and interconnect 30 via filaments 32. The electrolyte is permeable to the $O^{-2}$ anions which pass via electric field through the electrolyte and combine with four hydrogen atoms to form two water molecules, giving up four electrons to the anode and interconnect 26 via filaments 28.

Figure 4:
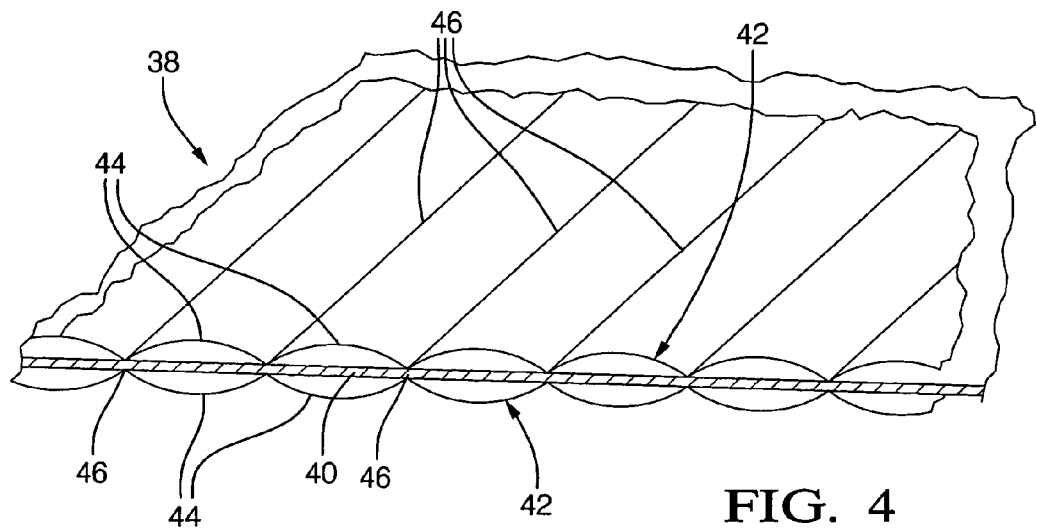
FIG. 4 is an isometric view of an interconnect plate and spacer assembly in accordance with the invention.

Referring to FIG. 4, an interconnect assembly 38 in accordance with the invention includes an interconnect plate 40, analogous to either of plates 26,30 in FIG. 1, and a formed, three-dimensional, conductive spacer 42 disposed on one side of plate 40. As shown in FIG. 4, spacer 42 may be formed into parallel corrugations having arcuate peaks 44 and valleys 46, the valleys making mechanical and electrical contact along at least a portion of their length with the surfaces of plate 40. Preferably, valleys 46 are bonded to plate 40 as by resistance welding, laser welding, or brazing. Preferably, a spacer 42 is disposed on each side of plate 40, as shown in FIG. 4.

Figure 5:
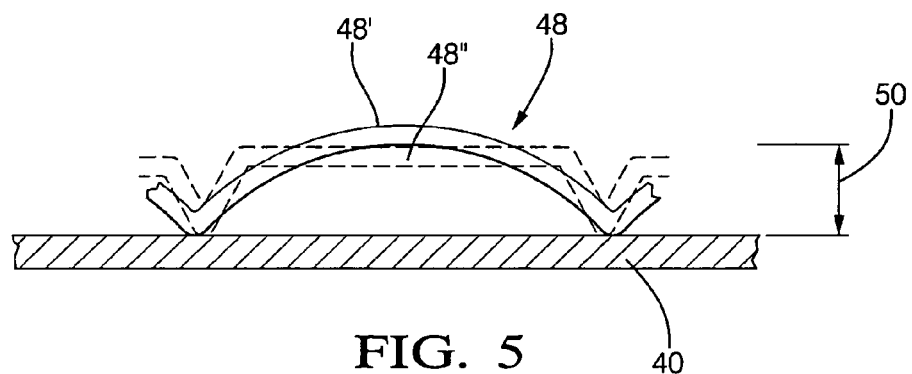
FIG. 5 is a detailed cross-sectional view of a loop of the assembly shown in FIG. 4.

Spacer 42 is preferably stamped in known fashion from wire mesh which may be woven in any convenient weave, as discussed further below. Preferably, the mesh is selected to provide both flexibility and resilience as well as conductivity. Referring to FIG. 5, a loop 48 of spacer 42 is shown in its non-compressed state 48'. After assembly into a fuel cell stack in known fashion, loop 48 is compressed into shape 48" by contact with either an anode or a cathode, the height 50 then representing the height of a gas passageway 22,24. The angle of bend at valley 46 and the spacing between adjacent bends 46 may be varied to control the stiffness of spacer 42.

In a currently preferred embodiment 52, spacer 42 is formed having a "dual-compression" feature. First loop portions 54 are relatively rigid, being formed at a relatively high first included angle 56 to plate 40, and providing good mechanical support between interconnect plate 40 and either the anode or cathode during assembly to define height 50. Second loop portions 58 between first loop portions 54 are formed at a low second included angle 59 to plate 40 and therefore are relatively easily compressed to height 50 during assembly. The durability and resilience of the wire mesh ensures that good electrical contact is maintained over a very large plurality of points of contact on the electrode surfaces during all conditions of use and also variation of gas flow space due to component tolerances.

The wire mesh may be formed in a variety of patterns, as desired for various degrees of stiffness, forming, and gas permeability, as well as bias in the folded wire. The warp and shute wires may be of different diameters or gauges. Further, it can be beneficial to include some percentage of high-conductivity shute wires; for example, making every other shute wire from silver or platinum in a mesh formed otherwise of appropriately resistant metal. Some suitable metals are stainless steel; nickel; nickel alloys including MONEL, HASTELLOY C-276, INCOLOY ALLOYS 600 and 800, NICHROME, and NICHROME V; molybdenum, tantalum, and tungsten. Suitable wire mesh materials are available from, for example, Newark Wire Cloth Co., Newark, New Jersey, USA.

Some exemplary weave patterns are shown in FIGS. 7 through 11. Other weave patterns are also comprehended by the invention.

Figure 7:
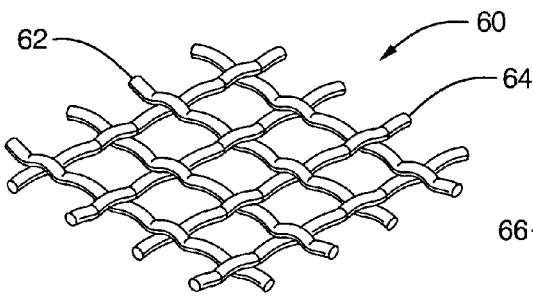
FIG. 7 is an isometric view of a simple lock wire weave.

FIG. 7 shows a simple lock weave 60 wherein crimping of the warp 62 and shute 64 wires is done in such a manner to actually 'lock' the wires together at their points of intersection, offering assurance of no wire movement. Weave 60 is currently preferred for use in forming assembly 38.

Figure 8:
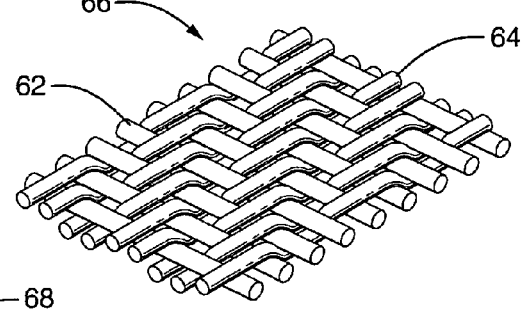
FIG. 8 is an isometric view of a twill wire weave.

FIG. 8 shows a twill weave 66 wherein each warp wire 62 and each shute wire 64 passes successively over and under the two adjacent wires, in both the warp and shute directions. This over and under movement is shifted one wire with each pass of the shuttle. Twill weave 66 permits the weaving of heavier wires in varying meshes.

Figure 9:
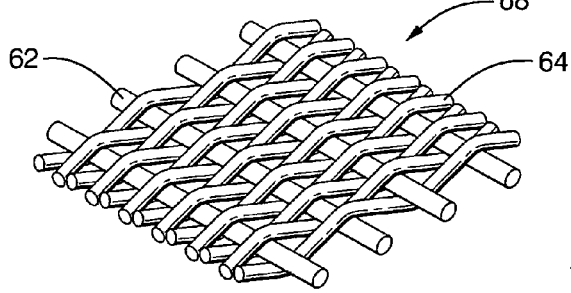
FIG. 9 is an isometric view of a plain Dutch wire weave.

FIG. 9 shows a plain Dutch weave 68 wherein the warp wires 62 are larger in diameter than the shute wires 64. The lighter shute wires are driven up close. This weave displays a tapered or wedge-shaped opening.

Figure 10:
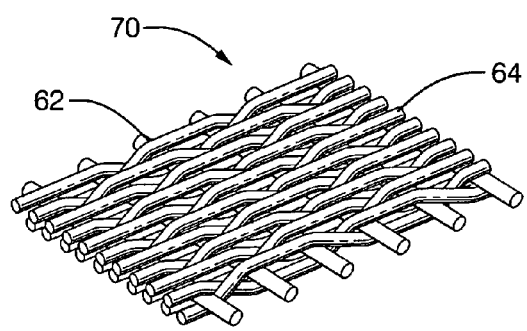
FIG. 10 is an isometric view of a twill Dutch wire weave.

FIG. 10 shows a twill Dutch weave 70 combining the twill weave and Dutch weave described above. The larger diameter warp wires 62 successively pass over and under the lighter diameter shute wires 64. Each pass of the shute wires shifts the over and under movement one wire. The shute wires are driven up close, resulting in a tightly woven filter cloth with tapered or wedge shaped openings.

Figure 11:
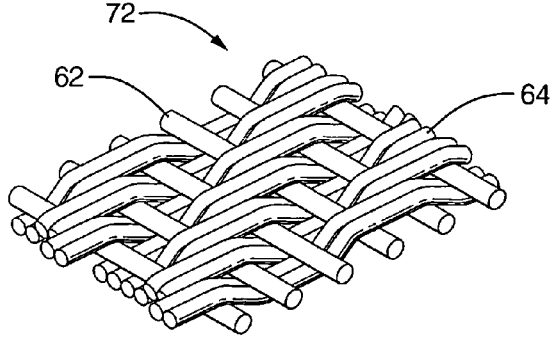
FIG. 11 is an isometric view of a twill Dutch double wire weave.

FIG. 11 shows a twill Dutch double weave 72 very similar to twill Dutch weave 70, but by proper selection of the wire sizes, the shute wires 64 actually overlap each other when driven up tight into position. This permits double the wires per inch in the shute direction.

Figure 2:
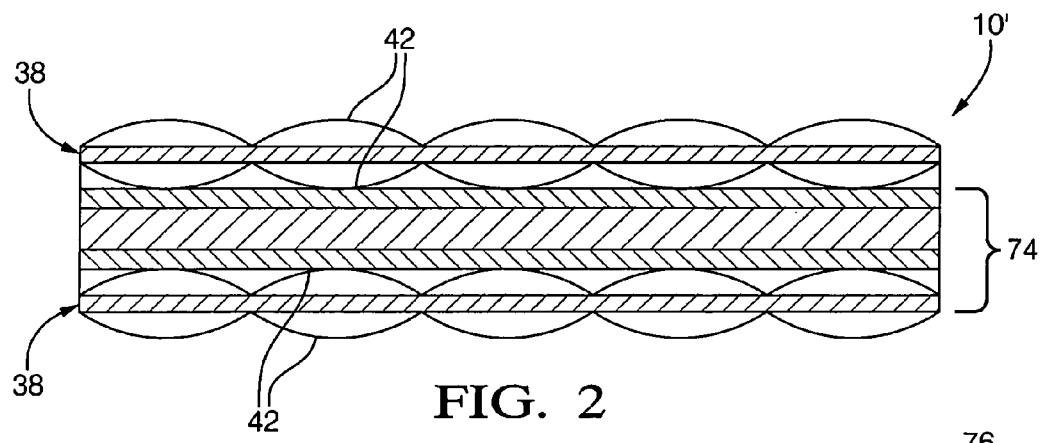
FIG.2 is a schematic elevational cross-sectional view of an improved solid oxide fuel cell assembly in accordance with the invention.
Figure 3:
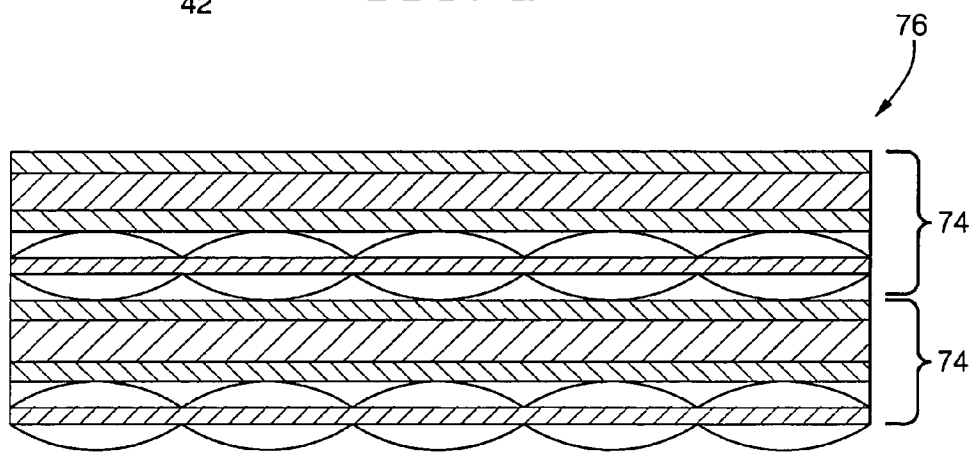
FIG. 3 is a schematic elevational cross-sectional view of a portion of an improved fuel cell stack in accordance with the invention.

Referring to FIG. 2, an improved fuel cell 10' is identical with prior art fuel cell 10 except that interconnect plates 26,30 and filaments 28,32 are replaced by two improved interconnect plate assemblies 38. A portion of fuel cell 10' may be considered a fuel cell module 74 which may then be combined with one or more such modules 74 to provide a fuel cell stack 76 in known fashion, as shown in FIG. 3 (note that in both FIGS. 2 and 3, the loops 48 are not shown in the compressed configuration as described above and shown in FIG. 5).

Figure 6:
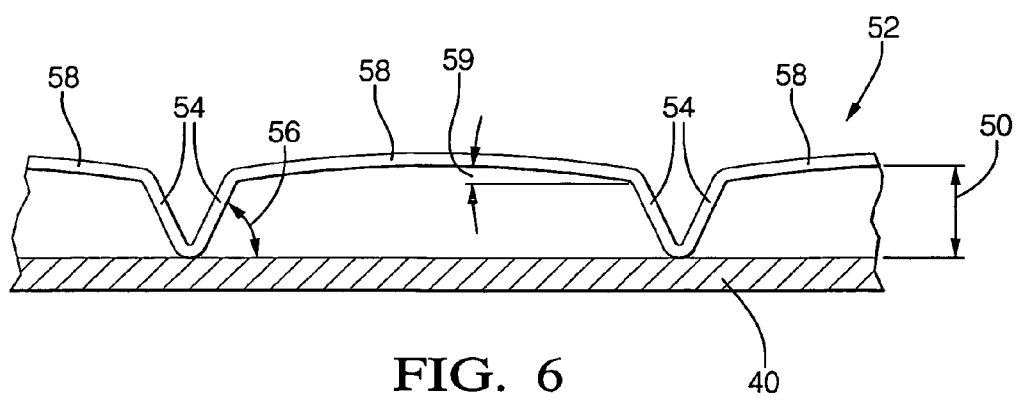
FIG. 6 is a preferred embodiment of a loop of a spacer assembly.
Figure 12:
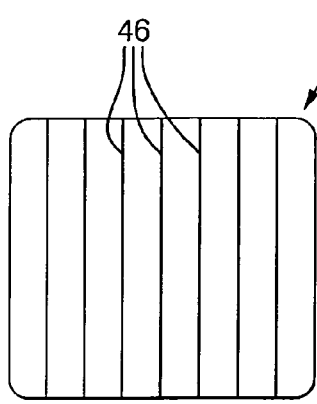
FIGS. 12 through 20 are plan views of various exemplary patterns for spacers in accordance with the invention.
Figure 13:
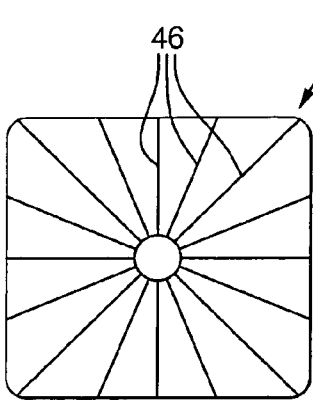
Figure 14:
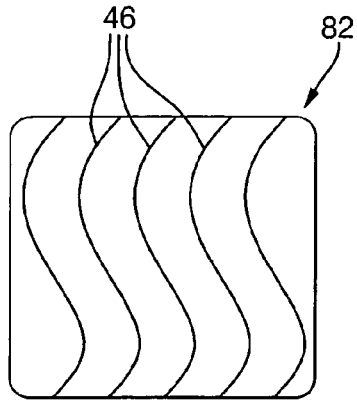
Figure 15:
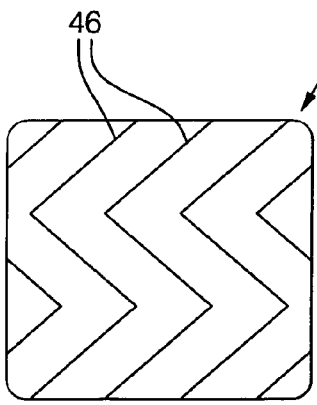
Figure 16:
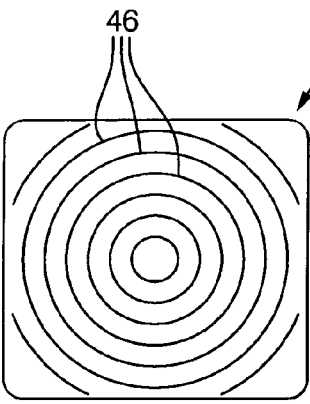
Figure 17:
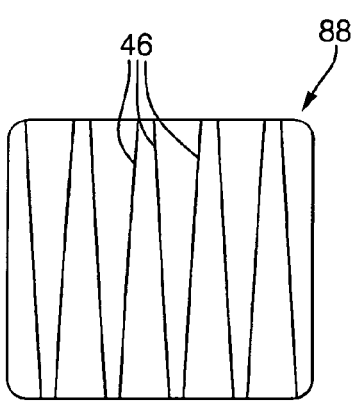
Figure 18:
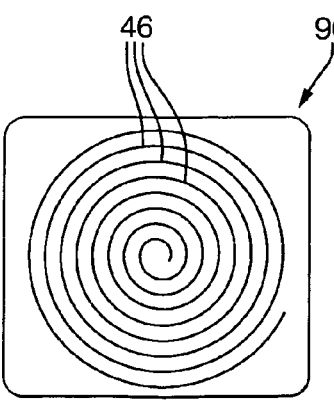
Figure 19:
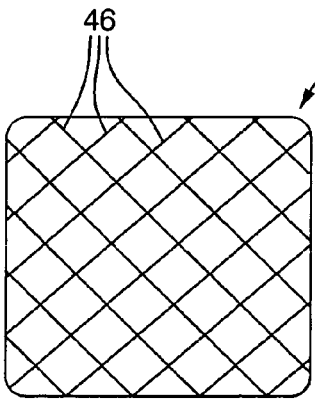
Figure 20:
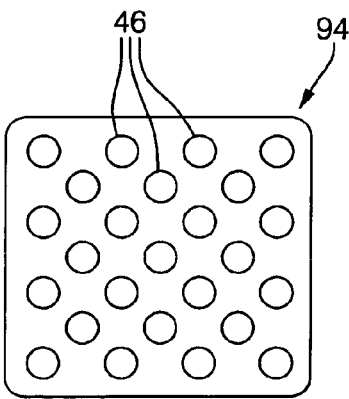

The valleys 46 and peaks 44 of assembly 38 may be oriented at any angle to the flow of gas 34,36 through the fuel cell, as determined in a specific application to optimize flow rate, back pressure, and distribution of gases over the surfaces of the electrodes. Further, any other stamping pattern which produces a three-dimensional conductive spacer 42 is comprehended by the invention. Some exemplary patterns are shown in FIGS. 12 through 20, as follows: FIG. 12, linear 78 (shown isometrically in FIG. 4); FIG. 13, starburst radial 80; FIG. 14, wavy 82; FIG. 15, zig-zag 84: FIG. 16, circular 86; FIG. 17, tapered linear 88; FIG. 18, spiral 90; FIG. 19, cross-hatched 92; and FIG. 20, dimpled 94. In any such pattern, the heights of the non-compressed peaks and compressed peaks are substantially as shown in FIGS. 5 or 6.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An electrically conductive spacer for disposition in a fuel cell apparatus in electrical contact with an electrode thereof and an interconnect plate, said spacer including metal mesh woven in a first pattern, said first pattern includes warp wires and shute wires, said woven spacer including corrugations in the shape of peaks and valleys on a surface of said spacer for making said electrical contacts, wherein said corrugations engage said plate at a first included angle to said plate at a plurality of locations on said plate, and wherein said corrugations include a second included angle to said plate at a height from said plate between two adjacent first included angles, said second included angle being smaller than said first included angle.

2. A spacer in accordance with claim 1 wherein said electrode is selected from the group consisting of anode and cathode.

3. A spacer in accordance with claim 1 wherein said spacer is a first spacer and is attached to a first surface of said interconnect plate to form an assembly.

4. A spacer in accordance with claim 3 wherein said assembly includes a second spacer substantially identical with said first spacer and attached to a second surface of said interconnect plate.

5. A spacer in accordance with claim 1 wherein said shape of said corrugations is selected from the group consisting of starburst radial, zig-zag, circular, tapered linear, spiral, and cross-hatched.

6. A spacer in accordance with claim 1 wherein said metal is selected from the group consisting of a stainless steel, nickel, nickel alloys, molybdenum, tantalum, and tungsten.

7. A spacer in accordance with claim 1 wherein said corrugations have a compressed height defining the height of a gas flow passage in said fuel cell apparatus.

8. A spacer in accordance with claim 1 wherein said shape of said corrugations is wavy.

9. A spacer in accordance with claim 1 wherein said shape of said corrugations is linear.

10. An assembly for use in a fuel cell stack, comprising:
a) an interconnect plate; and
b) a first electrically conductive spacer including metal mesh woven in a first pattern, said first pattern includes warp wires and shute wires, said first woven spacer including corrugations in the shape of peaks and valleys on a surface of said first spacer for making electrical contact with said plate and an electrode in said fuel cell stack, said first spacer being attached to a first side of said plate, wherein said corrugations engage said plate at a first included angle to said plate at a plurality of locations on said plate, and wherein said corrugations include a second included angle to said plate at a height from said plate between two adjacent first included angles, said second included angle being smaller than said first included angle.

11. An assembly in accordance with claim 10 further comprising a second electrically conductive spacer attached to a second side of said plate.

12. A fuel cell stack comprising at least first and second fuel cell modules conjoined by an assembly including a plate and first and second electrically conductive spacers attached to first and second sides of said plate, said spacers including metal mesh woven in a first pattern, said first pattern includes warp wires and shute wires, said woven spacers including corrugations in the shape of peaks and valleys on a surface of each of said spacers for making said electrical contact with said plate and with electrodes in said first and second fuel cell modules, wherein said corrugations engage said plate at a first included angle to said plate at a plurality of locations on said plate, and wherein said corrugations include a second included angle to said plate at a height from said plate between two adjacent first included angles, said second included angle being smaller than said first included angle.

* * * * *